United States Patent Office 3,674,326
Patented July 4, 1972

3,674,326
SHAFT BEARING SEALED AGAINST PRESSURE
Rudolf Kaiser, Ettlingen, Baden, Germany, assignor to Neue Argus Gesellschaft m.b.H., Baden, Germany
Filed Feb. 17, 1970, Ser. No. 11,979
Claims priority, application Germany, Feb. 18, 1969,
P 19 08 074.1
Int. Cl. F16c 33/74
U.S. Cl. 308—36.1                2 Claims

ABSTRACT OF THE DISCLOSURE

Pressure sealed shaft bearing for passing shafts through walls that separate areas which are under different pressures, where the wall passage for the shaft is knurled or its surface is treated in an equivalent manner and a bearing sleeve of thin walled suitable plastic is provided which is calibrated or grooved into the hole in the wall, and where the material of the grooved in sleeve (4) of plastic material penetrates into the recesses (17) in the inner surface of the hole while not completely filling them because capillary spaces (18) are formed in the deepest recesses, and where the plastic sleeve is provided with a sealing flange at the outside of the wall (1) that faces the low pressure which rests against a shoulder defined by an annular recess (7) in the wall.

BACKGROUND OF THE INVENTION

The invention relates to shaft bearings and is particularly concerned with a pressure sealed shaft bearing for passing shafts through walls separating areas of different pressures, which bearing, besides journalling the shaft, is simultaneously adapted to seal the bearing against pressure from one side. The invention is concerned primarily with a bearing for shafts that are passed through pressure sealed housings of armatures, conduits, boilers or the like, which conduct or contain media that are at high or extremely high pressure with respect to the surrounding atmosphere. The shafts may be control shafts that effect repetitive turning movements within certain angular limits, but they may also be shafts that rotate continuously. An example of such a shaft is the control shaft for ball spigots which are inserted in conduits for shutting them off and controlling them, and which conduits carry media at high pressure or, in certain cases, at increased temperatures.

Shaft bearings having wall passages which are knurled or have their surface similarly treated and which have a bearing sleeve of thin walled suitable plastic material which is grooved into the wall opening are known.

The invention is essentially based on the problem of constructing such a shaft bearing with simple and economical means which, besides that, may be installed in simplest fashion. In this connection there is the requisite, in spite of simplicity and economy, that the bearing meets the requirements of the practice which include, for example, a certain minimum of switching operations for the shaft before the bearing shows wear and therefore also leakage phenomena under the pressure and temperature conditions to be met.

SUMMARY OF THE INVENTION

In accordance with the invention the problem is solved in connection with a shaft bearing such as described in that the material of the calibrated plastic sleeve penetrates into recesses in the inner surface of the wall passage but does not completely fill the same as recesses are formed in the deepest areas which constitute capillary spaces, and that at the outside of the wall which faces the lowest pressure the plastic sleeve is equipped with a sealing flange that engages a shoulder formed by a turned or lathed recess provided in the wall.

In the shoulder formed by this turned recess, annular grooves may advantageously be provided into which the material of the flange of the plastic sleeve may penetrate more or less deeply.

Furthermore, the recesses of the inner surface in the wall passage are preferably defined by grooves extending parallel to the axis and one or more grooves cut in helically. Thus, with the simplest manufacturing operations a net of recesses is formed, which cut one another generally at right angles which include substantially pyramid-shaped elevations.

It has been found to be advantageously to provide an additional pressure ring made of rigid material pressed from the outside against the flange of the plastic sleeve.

By means of the shaft bearing in accordance with the invention an excellent bearing and seal is obtained with simple means, as determined by extensive tests, even under the most severe operating conditions. The reason for this appears to be that due to the extremely thin remaining wall thickness of the plastic sleeve for the bearing between the shaft and the elevations on the inner surface of the bore in the wall, the material of the sleeve cannot flow even under extreme conditions of load. On the other hand, the medium under pressure can advance in the capillary-like spaces in the region of the recesses of the inner surface below the plastic sleeve, up to the flange, where an annular pressure zone is developed surrounding the sleeve, which results in this area in a flawless seal between bearing and shaft.

In order to prevent that under extreme conditions the flange may be torn loose from the plastic sleeve, the pressure ring already mentioned may be provided.

BRIEF DESCRIPTION OF THE DRAWING

The invention and details thereof, as well as advantages obtained thereby, are explained in the following specification with reference to the drawing showing an embodiment of the invention as an example, and in which.

DESCRIPTION OF THE INVENTION

Figure 1:
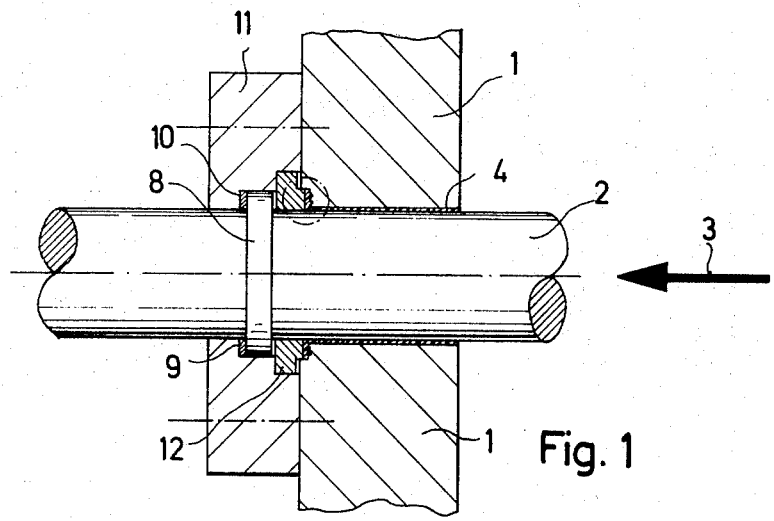
FIG. 1 shows a cross-section of the pressure resisting bearing in accordance with the invention.
Figure 2:
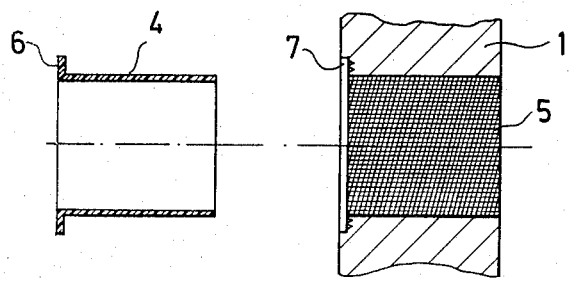
FIG. 2 shows the bore of the bearing and the plastic bearing sleeve prior to assembly, also in section.
Figure 3:
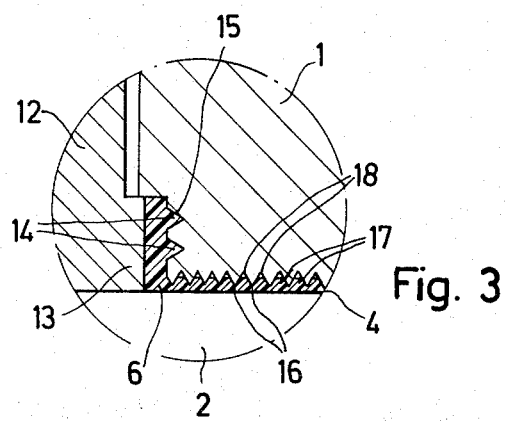
FIG. 3 illustrates, to an enlarged scale, the circular area indicated in FIG. 1 in dot and dash lines.

A shaft 2, for example a control shaft for operating a member inside a wall 1, is extended through the wall 1 of a container, an armature housing or the like. As a particular example a ball spigot is mentioned here which has a ball plug to be actuated by the control shaft and which is located in a conduit that may, for example, conduct media under high and extremely high pressures and also at high temperatures.

Thus, shaft 2 must be able to effect an indefinite number of switching operations, without deterioration of the bearing qualities of its bearing support in the wall 1 or without leakage developing in the bearing passage. The same also applies, of course, to shafts that perform a continuously rotating movement.

Th arrow 3 points in the direction in which the pressure acts upon the shaft 2 in the interior of the space that is encompassed by the wall 1.

It has been discovered that, surprisingly and without the expenditure of any additional means for journalling and/or sealing, a simple sleeve 4 of plastic material is sufficient, which is fitted or grooved in the bore 5 in wall 1, with the bore surface being treated in any desired manner, that there are elevations and recesses which are connected with each other. For example, the bore can be provided with grooves, parallel to the axis, which are cut from a helical groove. Thus there develop penetrating recesses and pyramid-shaped elevations on the inner surface of the bore. This surface could just as well be knurled, whereby pyramids of exactly square or rectangular shape would be formed. The recesses and elevations described can, of course, be introduced in any other desired manner.

The sleeve 4 of plastic material is provided with a flange 6 that embeds itself in an annular recess 7 in the wall 1 which is provided there opposite the outside, i.e., the pressure side.

Moreover, the shaft 2 has a collar 8 that is located opposite a shoulder 10 in an expansion of a cover 11 with a sliding ring 9 therebetween.

As reflected by the example illustrated in the drawings it is possible, especially for controlling extreme pressure conditions, to provide in addition a pressure ring 12 made of rigid material, which is pressed by means of a configuration 13 formed on a lathe, by way of cover plate 11 against the flange 6 of the plastic sleeve 4 where the portion 13 and flange 6 have the same diameter while the conventional tolerances are maintained.

The annular recess 7 may be provided with grooves 15. As the flange 6 of the plastic sleeve is put under pressure there result annular elevations 14 on the inside thereof, due to plastic flow of the material, which contribute to the sealing.

The sleeve of plastic material may be of any desired suitable plastic. The material which at present meets the requirements in practice is tetrafluorethylene. Polyamide has also been suitable for problems in different fields, especially if the sleeve is grooved in with a heated mandrel.

If the thin walled plastic sleeve 4 is fitted into the bore 5 whose surface has been properly treated, then the material of the plastic sleeve flows into the recesses in the surface of the bore in such a manner that on the one hand, there remains only a very thin amount of the plastic sleeve between the points 16 of the elevations of the surface of the bore 5 and the surface of the shaft 2. On the other hand, the recesses 17 of the surface of the bore are not completely filled by the material of the plastic sleeve, so that areas 18 remain which have capillary characteristics. The wall thickness of the sleeve varies between about 0.5 and 0.6 mm. before installation, and between about 0.2 and 0.3 mm. above the points of the surface of the bore after installation.

The surprisingly flawless operation of the pressure resistant bearing as regards bearing qualities and sealing is believed to be due to the condition that the very thin areas remaining between the points 16 and the surface of the shaft 2 can no longer flow away, while on the other hand the medium under pressure penetrates through the capillary spaces 18 to the flange 6 between the plastic sleeve 4 and the surface of the bore 5 and builds up an annular pressure area there, so that a flawless seal is formed between the surface of shaft 2 and the opposite surface of the plastic sleeve 4.

Since it must be expected under certain circumstances that at least under extreme pressure conditions the flange 6 can be torn off from the sleeve 4 in the corner area between the two, the pressure ring 12 is provided.

The pressure sealed shaft bearing in accordance with the invention permits that all requirements imposed in the practice are met with the simplest means, as far as the required components are concerned, their processing, as well as also their assembly.

Having now described my invention with reference to the embodiment illustrated in the drawing, what I desire to protect by Letters Patent is set forth in the appended claims.

I claim:

1. Shaft bearing sealed against pressure where the shaft extends through walls separating areas under different pressures, where the surface of a bore defining the passage for the shaft through the wall is coarse from knurling or the like and a thin walled bearing sleeve of suitable plastic material is fitted in the passage through the wall, the inner surface of the passage in the wall having recesses and the material of the thin plastic sleeve being embedded in said recesses without completely filling the deepest areas of the recesses, said plastic sleeve having a sealing flange on the outside of said wall that faces the low pressure, a cut out recess defining a shoulder in said wall wherein said flange is received, a pressure ring of rigid material and a cover plate pressing said ring against said flange.

2. Shaft bearing sealed against pressure in accordance with claim 1, where annular grooves are provided in said shoulder defined by said cut out recess.

References Cited
UNITED STATES PATENTS

| | | | |
|---|---|---|---|
| 3,075,816 | 1/1963 | Harris et al. | 308—238 |
| 2,538,422 | 1/1951 | Kollsman | 277—27 |
| 2,981,573 | 4/1961 | Reuter | 308—36.1 |
| 3,465,425 | 9/1969 | Leidenfrost | 277—56 |

MARTIN P. SCHWADRON, Primary Examiner

B. GROSSMAN, Assistant Examiner

U.S. Cl. X.R.

277—55; 308—36.3